Patented Oct. 5, 1954

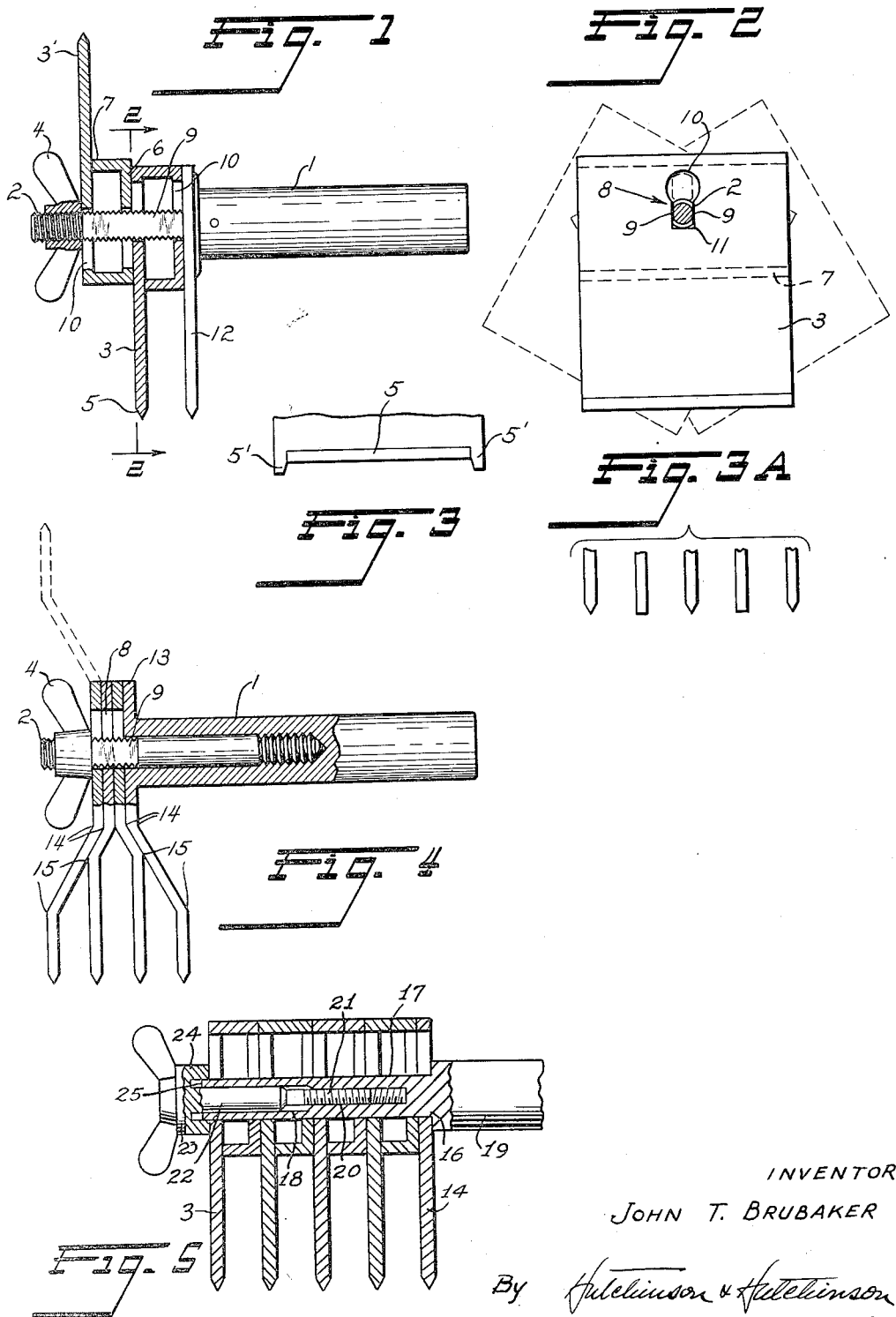

2,690,616

UNITED STATES PATENT OFFICE 2,690,616

VEGETABLE CHOPPER AND MEAT TENDERIZER

John T. Brubaker, Alexandria, Va.

Application April 10, 1950, Serial No. 155,115

8 Claims. (Cl. 30—304)

This invention relates to a novel construction of bladed device primarily intended for use in tenderizing meat or chopping vegetables and the like, and more particularly to the manner of mounting the blades in the device to facilitate cleaning thereof with a minimum of effort on the part of the user.

In known tenderizing and chopping devices embodying a plurality of spaced parallel blades carried by a head or handle member, it has been extremely difficult and necessarily time-consuming to properly clean the device after use. Particularly has this been true in the removal of material that has become wedged and compacted between the blades during the chopping or tenderizing process, and to thereafter properly clean these inner surfaces. In these known instances, the device has to be completely disassembled, if this is possible, or in lieu thereof an instrument has to be inserted between the blades to force out the compacted material. In either instance considerable time is consumed and in the last mentioned instance a clean sanitary condition is almost unobtainable.

It is therefore the primary object of this invention to provide a vegetable chopper and meat tenderizer wherein a plurality of blades are so mounted as to permit the blades to be easily separated from each other to facilitate cleaning thereof without having to completely detach the blades from the device.

Another object of the invention is to provide a blade carrier of this character with means to hold a plurality of blades in parallel relation and in which lock means is provided to securely hold all of the blades in alignment for use, which lock means is easily releasable to permit one or more of the blades to be moved relative to the other blades (in a plane parallel to said blades) to facilitate access thereto for cleaning purposes without the necessity of detaching the blades from the blade carrier, and which device can thereafter be quickly manipulated to restore the blades to original aligned locked position.

To the accomplishment of the above and related objects, as will appear as the description proceeds, the invention may be embodied in the forms illustrated in the accompanying drawings, attention being called to the fact, however, that the drawings are illustrative only, and that changes may be made in the specific construction illustrated and described, so long as the scope of the appended claims is not violated.

In the accompanying drawings which form a part of this application,

Figure 1 is a view in side elevation of one form of the improved vegetable chopper and meat tenderizer with several of the blades and part of the wing nut shown in section;

Figure 2 is a sectional view through the threaded shaft taken on the line 2—2 of Figure 1 and showing in elevation one of the blades and illustrating in dotted lines the rotatable relation of the blades;

Figure 3 is a fragmentary plan view of one form of blade edge;

Figure 3a is a fragmentary side elevation of a plurality of blade ends showing one arrangement thereof;

Figure 4 is a side elevation of a slightly different form of device with the handle member and blades partly broken away and shown in section;

Figure 5 is a fragmentary side elevation with parts thereof broken away and shown in section of a modified form of means for clamping the blades.

Like reference characters are used throughout the following specification and the accompanying drawings to designate corresponding parts.

While this invention may take various structural forms, as will be pointed out hereinafter, basically it relates to a vegetable cutter or meat tenderizer comprising a plurality of spaced parallel blades, a blade holder or carrier element, means for retaining or carrying the blades on or in said holder or carrier element so that one or more of the blades may be rotated, pivoted, or moved, with reference to the other blades and in a plane parallel thereto to afford ready access to the surfaces of the blades for cleaning the same without having to completely remove the blades, together with means for securely locking the movable blade or blades in firm chopping position with the operative edges of the blades being in alignment.

Furthermore, it will be noted that the invention basically involves a definite cooperation between a specific form of blade and a specific form of blade holder which permit the blades to be locked securely in parallel alignment when the device or implement is to be used and which permit the blades to be quickly and easily unlocked and moved out of alignment so as to afford access to the surfaces of the blades for cleaning thereof.

In one form of the invention shown in Fig. 1 the blade carrier comprises a handle 1 and a threaded shank or bolt 2 extending therefrom for the reception of a plurality of metallic blades 3 which are adapted to be securely clamped to the handle by means of the wing nut 4 screw threadedly received on the bolt 2. The handle may be formed of wood, metal or any other suitable material and the bolt 2 may of course be made integral with the handle if it is so desired.

Each of the blades 3 is formed with a suitable cutting, chopping or tenderizing edge 5, which edge may be sharp or dull depending upon the work to be accomplished, and which edge may be straight as shown in Fig. 2. The opposite end of the blades is formed or bent back upon itself as shown at 6 with the edge 7 thereof turned in toward the body of the blade to produce a convenient means for spacing adjacent blades when a group of said blades are assembled on the blade carrier as will be readily apparent from an inspection of Figs. 1 and 2. It will be appreciated that this looped or folded portion of the blade may be formed of any desired width depending upon the spacing desired for a particular chopper.

Each blade 3 has an aperture 8 of keyhole configuration punched or otherwise formed through the body of the blade 3 and the fold 6 in the folded end portion thereof, which apertures are in register with each other and with the corresponding apertures of the other blades, for receiving therethrough the shank 2 when the blades are assembled on the carrier element.

The threaded shank 2 is formed with a reduced cross sectional area throughout at least that portion of the shank which will support the blades when assembled thereon, which reduced portion is in a transverse direction when viewing Fig. 2 and formed in any manner, such as by the cutting away of the opposite sides of the shank to produce the flat side surfaces 9. It will be understood that the circular opening 10 of the keyhole aperture 8 will be formed sufficiently large to receive the full diameter of the shank 2 and permit the blades to be freely movable thereon when the thumb or wing nut 4 is loosened and not applying clamping pressure to the blades. However, rectangular opening 11 of the keyhole aperture 8 is only of sufficient width to receive the reduced portion of the shank, the flat sides 9—9 of the shank fitting closely the side walls forming the opening 11, said flat sides and side walls cooperating with each other to prevent rotation of the blade with respect to the shank 2 when the reduced portion of the shank rests in the rectangular opening 11.

Preferably when the handle 1 is formed of metal the first blade, such as that indicated at 12 in Fig. 1, is made integral therewith. This is also shown at 13, in the slightly modified form of device disclosed in Fig. 4. However, it will be appreciated that all blades may be made separate from the carrier element including the first blade such as that shown at 14 in the slight modification illustrated in Fig. 5. If the first blade is formed separately from the handle 1 then it too is preferably provided with a keyhole aperture 8 similar to the other blades.

While only three blades are shown in the Fig. 1 disclosure for illustrative purposes, it will be appreciated that any suitable number of blades may be used depending of course on the length of the reduced portion 9 of the shank 2.

In assembling the device, the shank 2 is inserted through the circular openings 10 of the keyhole apertures 8 with the handle 1 supported in the operator's hand. If the implement is held with the handle horizontally positioned the ends 5 of the blades will naturally gravitate to the position shown in Fig. 2. The operator may then rest all cutting edges of the blades against the cutting block or other flat horizontal surface and with the handle still in a horizontal position a slight downward movement of the handle will bring the reduced portion 9 of the bolt into the rectangular opening 11 in the keyhole aperture. Holding the unit in this position, the operator can then tighten the wing nut against the outer face of the end blade to securely clamp the entire series of blades between the wing nut and the handle or as the case may be the first blade 12, if the first blade is integral with the handle. The device is then ready for use.

After the chopping, cutting or tenderizing operation is completed, the operator merely unscrews the wing nut 4 a couple of turns or sufficiently to relieve the clamping pressure and to permit the blades to move freely on the shank 2 with respect to each other. As soon as the pressure is released as described, and with the handle still in the hand, the blades will drop down so that the reduced portion 9 of the shank no longer rests in the rectangular opening 11 but now extends through the circular opening 10 of the blades, in which position the operator may freely swing and rotate each blade separately from the others to easily release the material wedged between the blades and to clean the surfaces thereof.

It will be noted that the major portion of the cutting blades will thus be freely accessible for cleaning thereof without the necessity of removing the nut and blades from the shank 2. Further, it will be understood that the blades so loosely held are nevertheless capable of being quickly returned to locked and clamped position by merely resting the blades on the chopping block and applying a slight downward pressure on the handle to return the reduced flat sided portion of the shank to the rectangular openings 11 of the blades to lock the same. Thereafter the nut will be given a turn or two to apply the clamping pressure necessary to retain the blades in locked position during use.

It is further to be pointed out that by virtue of the keyhole aperture and cooperating reduced flat sided shank portion any one or more selected blades may be reversed, that is rotated 180° from cutting position, and there locked in place. In Fig. 1 the blade 3' has been so reversed and locked out of cutting position. This construction therefore permits the operator to select any desired number of blades he might wish to use depending upon whether a finely or coarsely chopped product is sought.

In Fig. 4 there is disclosed a slightly modified blade and blade grouping arrangement which is however adapted for use in a manner similar to that described in connection with the Fig. 1 form of the invention. This form of invention is primarily devised for a light weight chopper construction in which the desired spacing of the blades 13 is effected by the bending or forming of the blades at 14 and 15. The blades are nevertheless provided with keyhole apertures and the shank formed with a reduced portion 9 to permit the blades to be securely locked in any selected number of blade arrangements such as heretofore described for fine and course chopping of vegetables and the like. Furthermore, the blades 13 may be easily released from locked position and rotated with reference to each other for cleaning purposes.

There is shown in Fig. 5 a different form of blade receiving shank and clamping wing nut arrangement in which the cooperating threaded members are mounted within the shank and normally out of contact with the material being chopped and thereby producing a more sanitary device in some respects. The shank 16 of this construction has a smooth exterior surface 17 provided with a reduced portion similar to the reduced portions 9—9 of Figs. 1 and 4. An open bore 18 is provided from the end of the shank 16 extending inwardly toward the handle or supporting member 19 with an inner portion of the bore of reduced cross section and threaded as at 20 for the reception of the threaded reduced portion 21 of the bolt 22 which is screwed in place by turning of the winged head 23. In this construction, it will be noted that the enlarged portion 22 of the bolt has a close sliding fit with the enlarged portion 18 of the bore and the flange 24 of the head 23 covers the end 25 of the shank and extends over a portion of the outside surface of said shank to bear against the surface of the end blade, whereby the inner threaded members 20—21 will be protected from contact with the material being chopped. By virtue of this construction, the winged head may be unscrewed sufficiently to release the clamping pressure on the blades to permit their free rotary movement on the shank for cleaning thereof while still keeping the threaded members protected.

The blades may take any desired shape such as the rectangular shaped blade shown in Fig. 2, or some other special configuration as will be readily understood. Further, it will be appreciated that the side faces of the blades may be provided with cut out portions or windows to prevent the material from wedging between the blades during use of the device. Further, the blades may be provided with sharp edges or dull edges and alternately assembled as shown in Fig. 3a. If desired, a cutting blade provided with a sharp edge 5 may be provided with extensions 5', preferably arranged at each end of the knife edge, for the purpose of preventing the knife edges from cutting completely through the meat when tenderizing the same.

From what has heretofore been said, it will be noted that the forms of the invention shown in Figs. 1 to 5, inclusive, have the further common object of providing a vegetable cutter or meat tenderizer which in addition to being one easily cleaned after use, constitutes a bladed device which permits the operator to select the blades he should so desire for a particular chopping operation to thereby secure a fine or coarse chopping without having to remove the blades from the blade carrier.

While the structures which have been described are all related to a device for permitting the blades to be pivoted out of alignment with each other for cleaning thereof, while still maintaining the blades on the blade carrier, it will be appreciated that some of the blade mounting means might be readily adaptable for use with disc type cutter blades and for mounting the same on power driven blade carrying spindles of dicing machines and the like. The locking means for the blades in the forms of the invention shown in Figs. 1 through 5 could be readily used to lock the disc blades to spindles of such power driven machines, particularly the form shown in Fig. 5, as will be readily understood.

I claim:
1. A vegetable chopper and meat tenderizer comprising a blade holder including a shank, a plurality of blades provided with apertures of keyhole configuration, said shank adapted to extend through said apertures and to pivotally support said blades in parallel relationship to each other, said shank having a reduced section including a flat surface receivable within the noncircular portion of the keyhole apertures to lock the blades against rotary movement when so positioned and means to clamp the blades in locked position.

2. The subject matter of claim 1 wherein each of the blades is provided with integral means for spacing the blades on the shank.

3. The subject matter of claim 1 wherein the upper end of each blade is folded back on itself to provide adequate spacing means for the blades.

4. A vegetable chopper and meat tenderizer comprising a blade holder including a shank, a plurality of blades provided with apertures of irregular configuration formed by joining circular and non-circular surfaces with the surfaces of circular configuration providing an opening larger than the diameter of the shank and with the surfaces of non-circular configuration, including at least one flat surface, forming an opening less than the diameter of the shank, said shank adapted to extend through said apertures and to pivotally support said blades in parallel relationship to each other, said shank having a reduced section including a flat surface receivable within the openings formed by the surfaces of non-circular configuration to lock the blades against rotary movement when so positioned by the cooperative engagement of the two recited flat surfaces and means to clamp the blades in locked position.

5. The subject matter of claim 4 wherein the locking means recited includes means for locking the blades in either of two selected positions with respect to the blade holder whereby selected blades may be locked with their cutting edges out of cutting position with reference to the cutting edges of other blades.

6. The subject-matter of claim 4, wherein the clamping means comprises fixed and movable abutments carried by the shank.

7. The subject-matter of claim 6 wherein the movable abutment has a screw threaded connection with said shank.

8. The subject-matter of claim 7 wherein the screw threaded connection is totally contained within an internal bore in said shank and thus protected from contact with the material being chopped.

References Cited in the file of this patent

UNITED STATES PATENTS

| Number | Name | Date |
|---|---|---|
| 527,002 | Mayer | Oct. 2, 1894 |
| 546,384 | Gore | Sept. 17, 1895 |
| 719,785 | Garda | Feb. 3, 1903 |
| 935,710 | Tyler | Oct. 5, 1909 |
| 1,437,624 | Tyler | Dec. 5, 1922 |
| 1,810,719 | Lowenthal | June 16, 1931 |
| 1,814,528 | Purcell | July 14, 1931 |
| 1,903,789 | Michaels | Apr. 18, 1933 |

FOREIGN PATENTS

| Number | Country | Date |
|---|---|---|
| 22,006 | Great Britain | Oct. 28, 1905 |